Nov. 25, 1969

S. HINLEIN 3,479,737

METHOD OF FABRICATING MAGNETIC TRANSDUCERS

Filed Sept. 15, 1966

INVENTOR
SIGMUND HINLEIN

BY Fred Jacob
ATTORNEY

Nov. 25, 1969      S. HINLEIN      3,479,737

METHOD OF FABRICATING MAGNETIC TRANSDUCERS

Filed Sept. 15, 1966      4 Sheets-Sheet 2

INVENTOR
SIGMUND HINLEIN

BY *Fred Jacob*
ATTORNEY

Nov. 25, 1969    S. HINLEIN    3,479,737
METHOD OF FABRICATING MAGNETIC TRANSDUCERS
Filed Sept. 15, 1966    4 Sheets-Sheet 3

INVENTOR
SIGMUND HINLEIN

BY Fred Jacob
ATTORNEY

INVENTOR
SIGMUND HINLEIN

BY Fred Jacob
ATTORNEY

United States Patent Office 3,479,737
Patented Nov. 25, 1969

3,479,737
METHOD OF FABRICATING MAGNETIC TRANSDUCERS
Sigmund Hinlein, Sudbury, Mass., assignor to Honeywell Inc., Minneapolis, Minn., a corporation of Delaware
Filed Sept. 15, 1966, Ser. No. 579,596
Int. Cl. H01f 7/06; G11b 5/42
U.S. Cl. 29—603
12 Claims

ABSTRACT OF THE DISCLOSURE

This disclosure relates to a method of fabricating a multi-channel head configuration. First and second core-supporting structures are fabricated by machining a metal slug to provide a pair of planar parallel surfaces, firmly supporting one of the slug surfaces, forcing a punch having at least two pairs of studs into the other slug surface to form a ribbed cavity, removing excess metal from the slug, and adhesively bonding core segments in spaces defined by the ribs.

---

The present invention relates in general to a new and improved method of fabricating magnetic heads and in particular to a method of fabricating a multi-channel head configuration.

The invention finds applicability in the fabrication of a multiple magnetic head structure, for example, in a read-after-write head configuration, where it is important that the mutual spacing of the respective magnetic heads be accurately controlled. In Patent No. 3,082,509 by Richard B. Lawrance, which is assigned to the assignee of the present application, a method of constructing a dual magnetic head structure is disclosed wherein certain components of both heads are built into a common unit, which is subsequently assembled with two separate units corresponding to the respective heads. While the method disclosed in the patent is advantageous in the fabrication of certain kinds of heads, it has only limited applicability to the manufacture of present day read-after-write head structures. This is due primarily to the different configuration of the heads required in present day high-speed digital data recording systems.

As is well known to those skilled in the magnetic recording art, a multi-channel read-after-write head performs a verifying function wherein the information in each channel is read out and checked immediately after it is recorded. The proper alignment in each channel of the cores of the respective heads, the accurate spacing of the two gap lines and the absence of gap scatter, are all important considerations which affect the fabrication technique employed. So do such desired head characteristics as a high signal-to-noise ratio, freedom from cross-talk and feedthrough noise, and interchangeability, i.e. the ability of each head structure to read out a magnetic medium recorded by a different head structure. A further and frequently overriding consideration in any fabrication process is the manufacturing cost.

In a co-pending application of Robert M. Boehme, Ser. No. 373,738, now Patent No. 3,414,971, a novel method for fabricating magnetic heads is disclosed which represents a signficant advance over prior art manufacturing methods in meeting the above-outlined requirements of a read-after-write head structure. While displaying materially improved characteristics over such prior art magnetic head structures, the read-after-write heads manufactured by the method disclosed in the aforesaid patent application are nevertheless subject to occasional misalignment of the cores. Such core misalignment is frequently attributable to dimensional variations—sometimes cumulative—of the core segments and of the cross-talk shields, which are stacked in the hobbed cavity of a given head section. The cost of fabrication increases significantly if rigid controls must be imposed on the dimensions of these components.

Although elaborate safeguards are taken, read-after-write heads produced by the aforesaid method are also prone to feedthrough noise, which may be defined as the existence of unwanted noise signals in the read head as a consequence of the energization of the write head. Insofar as it is transmitted through the dual head structure, a signficant amount of feedthrough is attributable to the presence of cross-talk shields in the adjacent sections of the respective heads of such a dual head structure.

As outlined above, it is generally desirable that magnetic heads be freely interchangeable. While core misalignment may be undesirable per se, it detracts from free interchangeability only when it occurs to a different degree in different head structures. This is similarly the case for feedthrough noise. An important deficiency of prior art manufacturing methods is their inability to repeatedly fabricate magnetic head structures having substantially identical characteristics.

It is a primary object of the present invention to provide a method for fabricating a dual magnetic head structure which is not subject to the foregoing disadvantages.

It is another object of the present invention to provide a method for fabricating a multi-channel read-after-write head structure wherein the magnetic cores are accurately aligned.

It is a further object of the present invention to fabricate a multi-channel read-after-write head structure which is substantially free from feedthrough by way of the structure.

It is an additional object of the present invention to repeatedly fabricate multi-channel read-after-write head structures having substantially identical characteristics.

It is still another object of the present invention to provide a simple and economical method for fabricating an improved multi-channel read-after-write head structure.

The novel features of the present invention, together with further objects and advantages thereof, will become apparent from the following detailed specification with reference to the accompanying drawings, in which.

Figure 1:
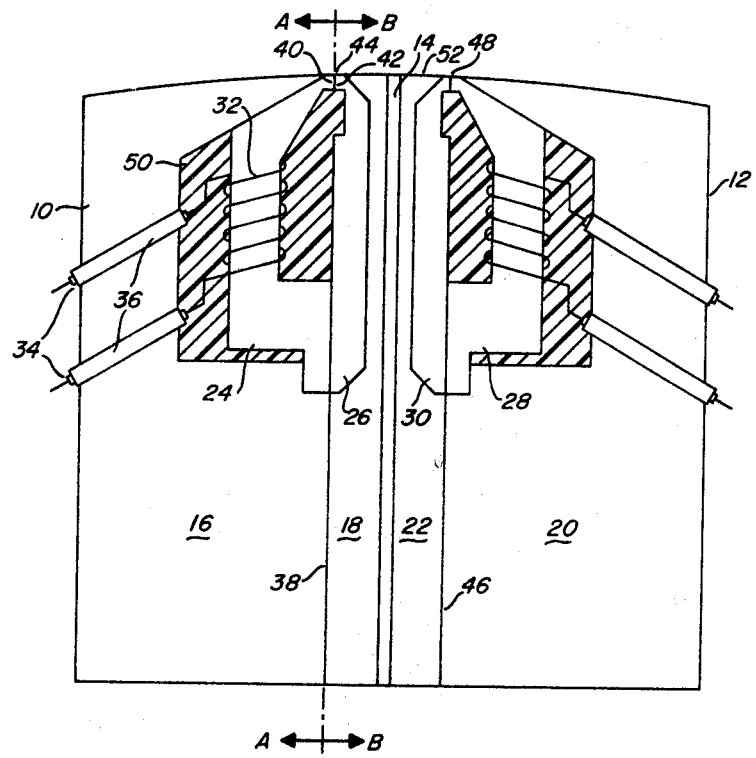
FIGURE 1 is a partial cross-sectional view of a read-after-write head fabricated in accordance with the present invention.

With reference now to the drawings, FIGURE 1, illustrates in partial cross section one embodiment of the dual head structure fabricated in accordance with the present invention. The dual head structure is seen to consist of a write head 10 and a read head 12 disposed on opposite sides of a separating shield 14 and terminating in a common arcuate surface 52 which is adapted to be presented to a magnetic medium. The write head 10 consists of a wound head section 16 and a return head section 18, while the read head 12 is formed of a wound head section 20 and a return head section 22. In the example under consideration, each head has a plurality of channels containing one magnetic core per channel.

The respective cores within each head are disposed in aligned relationship in successively spaced parallel planes. In a preferred embodiment, the cores of the write head 10 have greater thickness than the cores of the read head 12 to accommodate slight misalignments during readout. Each core consists of two segments, e.g., the wound core segment 24 which forms part of the wound head section 16 and the return core segment 26 which forms part of the return head section 18. Similarly, the wound core segments 28 and the return core segments 30 are disposed in the head sections 20 and 22 respectively, of the read head 12. As shown, each wound core segment carries a winding, e.g., the winding 32 on the core segment 24, which communicates with a pair of terminals 34 through conduits 36.

The head sections 16 and 18 of the head 10 abut in a common plane 38. Confronting pole faces 40 and 42, corresponding to each pair of core segments 24 and 26, are seen to lie in the plane 38. A non-magnetic material is disposed between the confronting pole faces 40, 42 to define a flux gap 44 therebetween. Similarly, the head sections 20 and 22 of the head 12 abut in a common plane 46, which includes confronting pole faces and a non-magnetic material between them to define a flux gap 48. The spaces between the cores and the body of each head are filled with a potting compound 50. It will be clear to those skilled in the art that the cores within each head must not only be in parallel alignment with each other, but that corresponding cores of the read and write heads respectively, in the dual head structure must lie in a common plane in order to define a channel.

Figure 3:
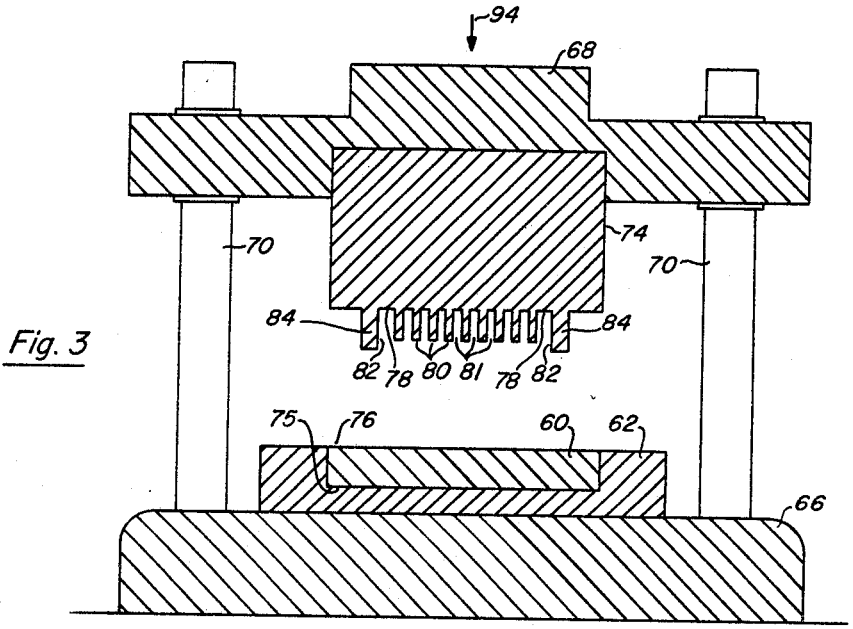
FIGURE 3 illustrates a step in the novel fabrication method in accordance with the present invention.

The fabrication method of a head section is explained here with respect to a return head section only, although it will be understood that the discussion may be similarly applicable to the wound head section. A slug of a non-magnetic material is preferably cut from round bar stock, in a practical example 2-inch diameter stock, and the faces are milled flat and parallel. Thereafter, the metal slug is annealed by subjecting it to a solution heat treatment. As shown in FIGURE 3, the annealed slug 60 is subsequently placed into a confining bed 62 of a die set 64, which itself rests on a press bed 66. The lower slug surface 75 is supported throughout by the confining bed 62. The die set includes a movable member 68 which is capable of sliding up and down on a pair of guides 70 and which is shown in its extreme upper position.

Figure 4:
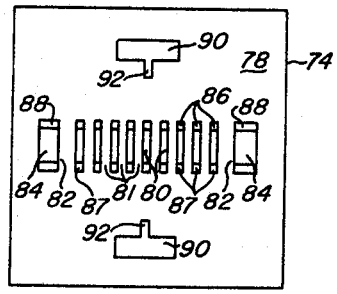
FIGURE 4 is a bottom view of the punch employed in the fabrication step shown in FIGURE 3.

The member 68 is provided with means for holding a punch 74 whose lower end, shown in detail in FIGURE 4, faces the upper surface 76 of the slug 60. The lower punch end is seen to comprise a surface 78 from which a preferably odd number of closely spaced, thin, parallel spines 80 extend toward the slug surface 76. The spines 80 define valleys 81 therebetween and are positioned between parallel facing surfaces 82 of a pair of relatively massive studs 84. These are disposed on opposite sides of the spines and protrude beyond the latter from the punch surface 78. As shown in FIGURE 4, the spines 80 have chamfered surfaces 86 and 87 and they accurately conform to the contours of the return core segments 26.

Two locator studs 90 extend from the punch surface 78 and are symmetrically positioned with respect to the spines 80, preferably on a line orthogonally intersecting a line connecting the studs 84. The locator studs preferably extend beyond the spines 80 by the same distance as the studs 84 and are seen to have a T-shaped cross section. The vertical T-portion 92 of each locator stud is aligned with the central one of the odd-numbered spines 80 and has the same thickness as the latter. In a preferred embodiment, the punch is built up of laminations which are appropriately shaped to define the spines 80. Here, the central lamination of the punch will not only form the central spine, but also the aforesaid vertical T-portion 92 of the locator study.

The member 68 is actuated by a conventional press (not shown) which is capable of imparting a downward force thereto in the direction of the arrow 94, throughout a stroke of controlled dimension. In carrying out a hobbing operation this force, which is preferably applied abruptly, causes the studs 84 and 90 to enter the slug surface 76 first. By holding down the slug near its periphery, the studs thus act to prevent "dishing" when the spines enter the slug surface 76, i.e., they prevent the slug from assuming a concave shape under the impact of the spines. The distance to which the studs and the spines penetrate the slug surface 76 is controlled in accordance with the regulated downward stroke of the member 68.

As previously explained, the lower slug surface 75 is supported throughout by the confining die bed 62. As a consequence, the metal displaced by the parallel spines 80 is constrained from moving in a downward direction. Similarly, the facing surfaces 82 of the reinforcing studs 84 provide a confining influence with respect to the displaced metal such that the latter is unable to move in an outward direction, i.e., toward the guides 70 in FIGURE 3. If the latter movement were permitted, the relatively thin spines would be forced to yield in the same direction and distort the dimensions of the resultant slug cavity. Owing to the geometry of the spines, there is no tendency for the displaced metal to move in the direction of the locator studs. The slug metal displaced by the spines 80 will therefore move only in an upward direction, i.e., toward the punch surface 78 into the valleys 81 between the spines 80.

Figure 5:
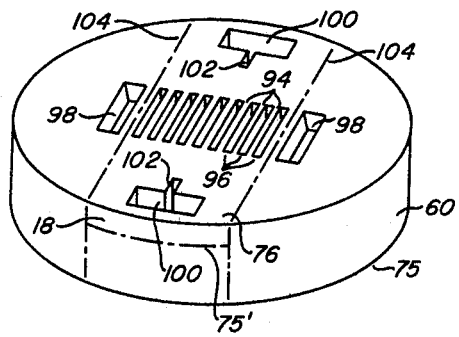
FIGURE 5 illustrates a hobbed slug which is produced by the fabrication step shown in FIGURE 3.

FIGURE 5 illustrates the hobbed slug 60 which results from the above-described operation. The slug is seen to contain a ribbed cavity having parallel planar ribs 94. These define precisely spaced slots 96 therebetween, that accurately conform to the contours of the return core segments of the respective heads. In a practical embodiment fabricated by the method in accordance with the present invention, the ribs of the write head had a thickness of the order of 0.022″, while the slots 96 had a width of the order of 0.048″. The ribs and slots of the read head each had a thickness of the order of .035″. As previously explained, dishing of the slug due to the impact of the centrally located spines is prevented by the action of the studs 84 and 90 which are effective to hold the slug surface 75 down against the confining die bed 62. While the elasticity of the slug metal causes the slug to re-assume its generally flat shape when the punch is withdrawn, neither the dimensions nor the positions of the slots will be accurate if dishing is permitted to occur. Under adverse conditions, the hobbed ribs may break. As shown in FIGURE 5, the ribbed cavity is bracketed by a pair of holes 98 which are made by the reinforcing studs 84. A pair of T-shaped locator holes 100, produced by the studs 90, is positioned on opposite sides of the ribbed cavity, the vertical T-portion 102 of each such hole being in alignment with the central one of the odd-numbered slots 96.

Following the hobbing operation, the slots 96 are painted with an adhesive compound and the return core segments 26 (in the case of the head section 18) are inserted therein. As previously explained, the contours of the slots 96 conform to those of the core segments so that the latter seat exactly in the slots. The adhesive compound is then oven-cured. Either before or after the insertion of the core segments in the slots, the portions of the slug which contain the stud holes 98 are milled away to provide parallel surfaces which are schematically indicated by the lines 104 in FIGURE 5. The return head section 18, with the core segments 26 inserted therein, is then machined to form a flat slab or nominal thickness having parallel surfaces 76 and 75′. The resultant thickness of the head section 18 is such that the locator holes 100 communicate with both surfaces 76 and 75′.

Figure 6:
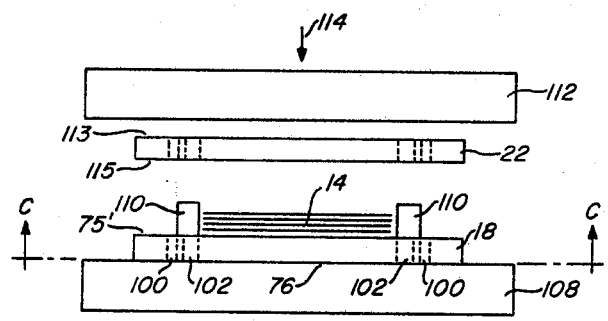
FIGURE 6 illustrates a step in the fabrication of a dual head return section structure.
Figure 7:
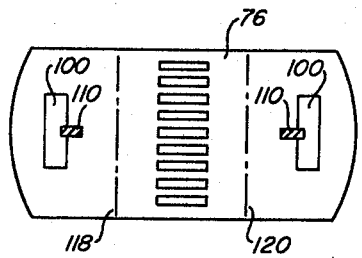
FIGURE 7 is a partial cross-sectional view of the structure illustrated in FIGURE 6.

The return head section 22 is fabricated in similar manner to that described in connection with the return head section 18. FIGURE 6 and FIGURE 7 which is a view taken along line C—C of FIGURE 6, illustrate the assembly of the two return head sections into an integral, dual return head section unit. The return head section 18 is positioned on a lower member 108 of a fixture, which has locator posts 110 of rectangular cross section that mate with the vertical T-portion 102 of the T-shaped locator holes 100. The position of the head section 18 is thus completely determined by the locator posts. The surface 76 of the head section, which contains the exposed core segments 26, now faces the fixture member 108.

The surface 75' of the head section 18 is then coated with an adhesive compound and the head separation shield 14 is built up thereon with successive laminations, each being coated with the adhesive compound. The surface 115 of the other return head section 22 is similarly coated with the adhesive compound. The latter head section is positioned on the locator posts 110 which mate with the vertical T-portion of the T-shaped locator holes thereof. As in the case of head section 18, the position of the head section 22 is now completely determined and its surface 113, which contains the exposed return core segments, faces upward and away from the shield 14. An upper fixture member 112 is subsequently positioned on the surface 113. Force is then applied in the direction of the arrow 114 while the adhesive is oven-cured in order to bond the two return head sections and the laminations of the intermediately positioned head separation shield 14 into an integral dual return head section structure.

The dual return head section structure is now machined to remove those portions which contain the locator holes 100. The resultant parallel surfaces are schematically indicated by the lines 118 and 120 in FIGURE 7. Following the machining of the surfaces 118 and 120, the dual return head section structure is ground to its final thickness to provide optically flat surfaces 76 and 113 which define the aforesaid common planes 38 and 46 respectively. The final thickness dimension determines the mutual spacing of the two gap lines in the finally assembled dual head structure. A groove 122 is ground in the surface 76 to define pole faces 42 on successive return core segments 26. Similarly, a groove 124 is ground into the surface 113 to define corresponding pole faces on the return core segments 30. See FIGURE 8.

Figure 2A:
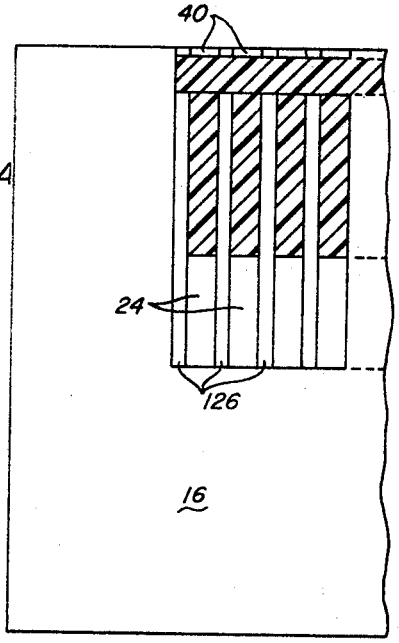
FIGURE 2 shows cross-sectional views of the apparatus of FIGURE 1.
Figure 2B:
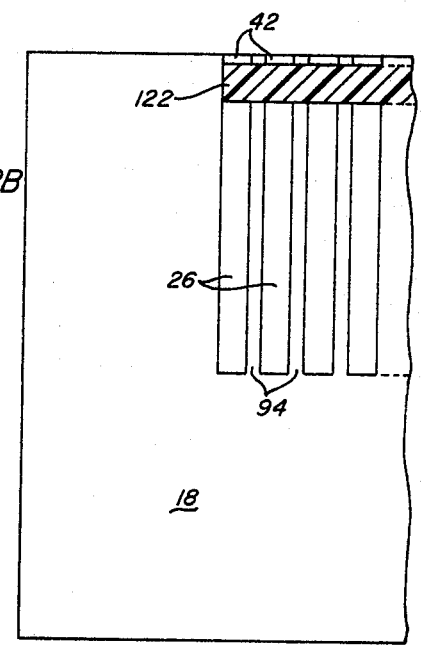

FIGURE 2B is a partial cross-sectional view taken on the line B—B of FIGURE 1 and it illustrates the construction of the return head section in the completed head. It will be noted that successive return core segments 26 are parallel and aligned with each other, being separated only by the ribs 94 which form part of the non-magnetic body material of the return head section 18. The groove 122 is cut into the return core segments 26 as well as into the ribs 94. However, the ribs extend beyond the groove and thus separate the pole faces 42.

FIGURE 2A is a partial cross-sectional view of FIGURE 1, taken along the line A—A. A cross-talk shield 126 is positioned between each pair of successive cores 24 to inhibit flux linkages between the respective data channels. Although not illustrated in FIGURE 1 in order to further clarity, it will be apparent that the cross-talk shields at least cover the wound core segments 24 and preferably extend beyond the latter in a direction away from the common plane 38, such a construction providing more complete shielding against stray flux linkages.

The wound head section may be fabricated as explained above, or it may be manufactured by hobbing a cavity without ribs in which the cores and the cross-talk shields are stacked in alternation. In such a case, parallel slots are preferably cut into the cavity surfaces to receive the cross-talk shields, and the cores are subsequently stacked between the shields. Thereafter, the wound head section is impregnated (possibly vacuum-impregnated) with a potting compound which is subsequently oven-cured. As a further alternative, the wound head section may be fabricated in a conventional manner, by building up successive laminations which define slots for receiving the crosstalk shields, the cores being stacked between the latter. Potting and oven-curing are carried out as before.

Figure 8:
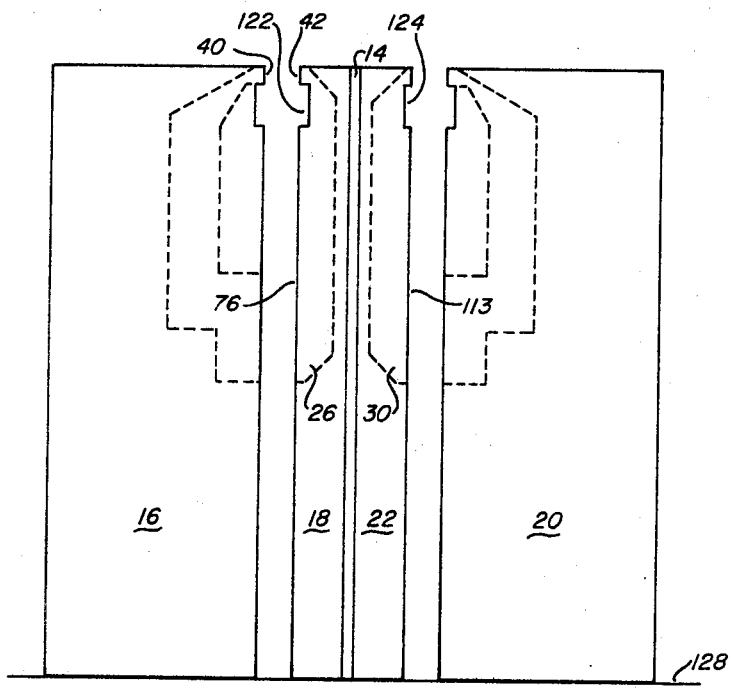
FIGURE 8 illustrates the final assembly step for a dual head structure fabricated in accordance with the present invention.

Following the fabrication of the two wound head sections, the appropriate surface in each is ground optically flat in order to define the aforesaid common planes 38 and 46 respectively. A groove is ground in each wound head section to define the pole faces on each wound core segment. The two wound head sections are then assembled with the integral dual return head section structure, such assembly preferably being carried out on a planar surface 128, as shown in FIGURE 8. A non-magnetic material is positioned between the facing pole faces of each head in order to define flux gaps therebetween. An adhesive compound is subsequently injected and a vacuum impregnation step may be employed in order to fill up the voids in the assembled dual head. Upon completion of the aforesaid assembly, the arcuate surface 52 is ground on the dual head structure to adapt the latter for presentation to a magnetic medium.

The novel method of fabricating a magnetic head structure in accordance with the present invention, described above, is relatively simple and economical to carry out. The subject method makes possible the reliable fabrication of a magnetic head structure whose characteristics are superior to those of prior art heads. Moreover, the fabrication method can be repeatedly carried out to produce dual head structures with substantially identical characteristics. The novel fabrication method is capable of producing heads wherein core alignment problems are largely overcome. In addition, the observable feedthrough of a head produced by the novel method is materially lower than that manufactured by prior art methods. These advantages further enhance the interchangeability of a medium recorded by a magnetic head produced by the novel method.

From the foregoing disclosure of the present invention, it will be apparent that numerous modifications and departures may now be made by those skilled in the art, all of which fall within the scope contemplated by the invention. Accordingly, the invention herein disclosed is to be construed as limited only by the spirit and scope of the appended claims.

What is claimed is:

1. The method of fabricating a magnetic head having a plurality of cores constructed of a material having a relatively high permeability, each of said cores consisting of first and second core segments disposed in first and second head sections respectively and having pole faces adapted to abut in a common plane, comprising the steps of:

preforming first and second core supporting structures for said head, each adapted to hold corresponding core segments and each constructed of a material having a relatively low permeability, the preforming process of said first core supporting structure including machining a metal slug to provide a pair of substantially planar parallel surfaces, forcing a punch into one of said parallel slug surfaces while the other slug surface is firmly supported throughout, said punch including a plurality of thin, parallel, planar spines protruding from a punch surface and bracketed between parallel, facing surfaces of a pair of relatively massive studs which protrude from said punch surface on opposite sides of said spines, at least a pair of additional studs protruding from said punch surface and bracketing said spines along a line approximately perpendicular to a line through said first-recited stud pair, said studs being effective to prevent dishing of said slug when said spines enter the latter, said facing stud surfaces being effective, when said spines enter said slug, to contain the displaced metal so as to force it upward toward said punch surface, said punch forming a ribbed cavity in said one slug surface between holes formed by said studs, said ribs being parallel and of predetermined thickness and defining slots therebetween which conform to the contours of said first core segments, applying an adhesive compound to said ribbed cavity, positioning said first core segments in said slots to form said first head section wherein said ribs alone define the mutual spacing of said first core segments, curing said adhesive compound, removing excess metal from said first head section, said second preformed core supporting structure including a further cavity in one of its surfaces having walls which conform to the contours of said second core segments, positioning cross-talk shields in said further cavity.

2. The method of claim 1 and further including the step of heat treating said slug following said first-recited machining step.

3. The method of claim 1 wherein the preforming process of said second core supporting structure includes the steps of machining a metal block to provide a pair of substantially parallel surfaces, heat treating said block, forcing a second punch into one of said parallel block surfaces to a depth less than the block thickness while the other block surface is supported only around its periphery, said punch forcing the displaced metal of said block out through said peripherally supported surface to form said further cavity, removing excess metal from said block including said displaced metal, and machining slots in the walls of said further cavity to receive said cross-talk shields.

4. The method of claim 1 wherein said potting compound is applied by vacuum impregnation.

5. The method of fabricating a subassembly for a multicore magnetic head, said subassambly including a plurality of like core segments, said core segments constructed of a material having a relatively high permeability, comprising the steps of:

machining a metal slug constructed of a material having a relatively low permeability to provide a pair of substantially planar parallel surfaces, forcing a punch into one of said parallel slug surfaces while the other slug surface is firmly supported throughout, said punch including a plurality of thin, parallel, planar spines protruding from a punch surface and bracketed between parallel, facing surfaces of a pair of relatively massive studs which protrude from said punch surface on opposite sides of said spines, at least a pair of additional studs protruding from said punch surface and bracketing said spines along a line approximately perpendicular to a line through said first-recited stud pair, said studs being effective to prevent dishing of said slug when said spines enter the latter, said facing stud surfaces being effective, when said spines enter said slug to contain the displaced metal so as to force it upward toward said punch surface, said punch forming a ribbed cavity in said one slug surface between holes formed by said studs, said ribs being parallel and of predetermined thickness and defining spaces therebetween which conform to the contours of said core segments, removing excess metal from said slug, applying an adhesive compound to said ribbed cavity and positioning said core segments in said spaces to form said subassembly wherein said ribs alone define the mutual spacing of said core segments.

6. The method of claim 5 and further including the step of heat treating said slug following said first-recited machining step.

7. The method of fabricating an integral, dual magnetic head structure having like pluralities of cores in both heads, the cores of respective ones of said head differing in thickness and being constructed of a material having a relatively high permeability, each of said cores consisting of first and second core segments disposed in first and second head sections respectively in each head and having pole faces adapted to abut in a common plane, comprising the steps of:

preforming first and second core supporting structures for each of said heads each adapted to hold corresponding core segments and each constructed of a material having a relatively low permeability, the preforming process of said first core supporting structure including machining a pair of metal slugs to provide a pair of substantially planar parallel surfaces on each slug, forcing one of a pair of punches into one of said parallel surfaces on each slug while the opposite slug surface is firmly supported throughout, each of said punches including a plurality of thin, parallel, planar spines protruding from a punch surface and bracketed between parallel facing surfaces of a pair of relatively massive re-enforcing studs which protrude from said punch surface on opposite sides of said spines, each of said punches further including a pair of locator studs protruding from said punch surface and bracketing said spines along a line parallel to the latter, said studs protruding beyond said spines and being effective to prevent dishing of the slug when said spines enter the latter, said facing surfaces of said re-enforcing studs being effective, when said spines enter said slug, to contain the displaced metal so as to force it upward toward said punch surface, each of said punches forming a ribbed cavity in said one slug surface positioned between a pair of locator holes and between a pair of holes due to said re-enforcing studs, said ribs being parallel and of predetermined thickness and defining slots therebetween which conform to the contours of said first core segments of respective ones of said heads, applying an adhesive compound to said ribbed cavity in each of said slugs, positioning said first core segments in said slots in each of said slugs to form a pair of said first head sections wherein said ribs alone defines the mutual spacing of said first core segments, curing said adhesive compound, machining each of said first head sections to a slab of nominal thickness to render said one surface thereof flat and parallel to its opposite surface, said locator holes communicating between said last-recited surfaces, said last-recited step further comprising the removal of excess metal including said re-enforcing stud holes, applying said adhesive compound to said opposite surfaces of respective first head sections, stacking said first head sections with said opposite surfaces facing each other and disposing a separating shield therebetween, clamping said first head sections and the intermediately positioned separating shield together under pressure to form an integral dual first head section structure, curing said last-recited adhesive compound, removing excess metal including said locator holes and machining said dual first head section structure to a predetermined final thickness between optically flat major surfaces thereof to form said common planes, said second preformed core supporting structures each including a further cavity in one of its surfaces having walls which conform to the contours of said second core segments, positioning cross-talk shields in each of said further cavities, stacking said second core segments between successive ones of said cross talk shields in each of said second core supporting structures to form a pair of said second head sections, impregnating each of said second head section with a potting compound, curing said last-recited potting compound, machining said one surface of each of said second head sections optically flat to form said common plane, grinding a transverse groove into each of said optically flat surfaces to define the pole faces of said core segments, assembling said dual first head section structure with respective ones of said second head sections to form said dual head structure, facing ones of said pole faces being aligned in abutting relationship in said common plane in each head, said last-recited step including disposing a non-magnetic material between said abutting pole faces to define flux gaps therebetween, impregnating said dual head structure with said potting compound, curing said potting compound, and machining a common arcuate surface which includes said gaps on said dual head structure adapted to be presented to a magnetic medium.

8. The method of claim 7 and further including the step of heat treating each of said slugs following said first-recited machining step.

9. The method of claim 7 wherein said step of stacking said first head sections with said separating shield comprises positioning one of said first head sections with said opposite surface facing upward in a fixture having a pair of locator posts which engage said locator holes, building up said separating shield on said last-recited surface with laminations of adhesively coated shielding material, and positioning the other first head section with its opposite surface facing said shield and with the locator holes thereof engaged by said posts.

10. The method of claim 9 wherein said punch spines form an odd number of slots in said one surface of each slug, said locator studs forming T-shaped holes in each of said one slug surfaces wherein the vertical T-portion is aligned with the central one of said slots, said locator posts having a rectangular cross section which mates with said vertical T-portion.

11. The method of claim 7 wherein said potting compound is applied by vacuum impregnation.

12. The method of claim 7 wherein the preforming process of said second core supporting structure includes the steps of:

machining a metal block to provide a pair of substantially parallel surfaces, heat treating said block, forcing a second punch into one of said parallel block surfaces to a depth less than the block thickness while the other block surface is supported only around its periphery, said punch forcing the displaced metal of said block out through said peripherally supported surface to form said further cavity, removing excess metal from said blocks including said displaced metal, and machining slots in the walls of said further cavity to receive said cross-talk shields.

References Cited

UNITED STATES PATENTS

| | | | |
|---|---|---|---|
| 3,082,509 | 3/1963 | Lawrance | 29—603 |
| 3,120,696 | 2/1964 | Lubkin | 29—603 |
| 3,195,119 | 7/1965 | Worosz | 179—100.2 X |
| 3,238,603 | 3/1966 | Curtis et al. | 179—100.2 X |
| 3,242,556 | 3/1966 | Broughton | 29—603 |
| 3,357,097 | 12/1967 | Schulte | 29—603 |

JOHN F. CAMPBELL, Primary Examiner

D. C. REILEY, Assistant Examiner

U.S. Cl. X.R.

179—100.2; 340—174.1